United States Patent [19]

Bhargava

[11] Patent Number: 5,455,489
[45] Date of Patent: Oct. 3, 1995

[54] DISPLAYS COMPRISING DOPED NANOCRYSTAL PHOSPHORS

[76] Inventor: Rameshwar N. Bhargava, 5 Morningside Ct., Ossining, N.Y. 10562

[21] Appl. No.: 225,613

[22] Filed: Apr. 11, 1994

[51] Int. Cl.⁶ ................................................. H05B 37/02
[52] U.S. Cl. ...................... 315/169.4; 315/307; 313/468
[58] Field of Search .................................. 313/468, 503, 313/467, 485; 252/301.4 R, 301.4 H; 315/169.1, 169.4, 291, 307; 428/403, 917, 690

[56] References Cited

U.S. PATENT DOCUMENTS

| 4,352,042 | 9/1982 | Lorenz et al. | 313/485 |
| 4,826,727 | 5/1989 | Glaser | 428/403 |
| 5,196,763 | 3/1993 | Yang et al. | 313/486 |

*Primary Examiner*—Benny Lee
*Assistant Examiner*—Michael Shingleton

[57] ABSTRACT

Electronic displays including CRTs and projection TV (PTV), field emission displays (FED), plasma and electroluminescent (EL) displays, all of whom involve the use of luminescent materials (active displays) for the transfer of information to an audience. The phosphor material used in these displays comprises doped nanocrystals; tiny, separated particles of the order of 100 angstroms or less and thus exhibiting quantum-confined properties. These quantum-confined particles of certain luminescent materials when doped with an activator yield ultra-fast and efficient phosphors. The resultant displays will possess high brightness and high resolution. In addition, certain of the displays will exhibit digital control and increased gray scale.

19 Claims, 6 Drawing Sheets

DISPLAYS COMPRISING DOPED NANOCRYSTAL PHOSPHORS

RELATED APPLICATION

Commonly-owned, application, Ser. No. 08/185,191, filed Jan. 24, 1994, entitled "Light-Emitting Device".

BACKGROUND OF THE INVENTION

This invention relates to display devices, and in particular to display devices using phosphor materials capable of emitting visible light or ultra-violet radiation (UV) in response to electron or ion bombardment or UV radiation excitation.

The promise of High Definition Television (HDTV) can not be realized in the near future in spite of the recent breakthroughs and developments in the digital addressing and signal processing areas. Key factors such as high resolution, brightness, and flat-slim configuration associated with current TV displays remain to be resolved. A number of the problems associated with currently-available displays are described in detail in the papers referenced as [1], [2], and [3], whose identification appears in the annexed listing of references. Many of the principal limitations fall in the domain of phosphors. These imitations, specifically, saturation, low efficiency, degradation, prevent achieving the necessary brightness and simultaneous high resolution in currently used phosphors. For example, the blue phosphor presently used in Projection TV (PTV) saturates at excitation intensities which are significantly lower than those required for normal operation. In addition, all bulk phosphors degrade rapidly when HDTV-mode focussed electron beams are used. To fulfill the goal of HDTV in the next decade, phosphors are needed with improved properties in one or more of the following respects: efficiency, linearity at both low and high electron excitation voltages, and non-degradable over operating time.

SUMMARY OF THE INVENTION

An object of the invention is an improved display device capable of higher resolution and/or higher brightness and/or less subject to degradation over time.

Another object of the invention is a cathode-ray tube (CRT) capable of higher brightness and higher resolution.

A further object of the invention is an improved X-Y matrix-addressed active display, such as a Field Emission Display (FED), plasma, or Electroluminescent (EL) display.

Still another object of the invention is a display employing phosphors exhibiting increased efficiency and brightness with expanded linearity and enhanced lifetime, simultaneously.

A further object of the invention are fast phosphors for use in FED, plasma, and EL or other X-Y matrix addressed active displays.

Another object of the invention is a higher contrast X-Y matrix active display.

In accordance with one aspect of the present invention, a display device comprises a phosphor screen or layer comprising doped nanocrystals (DNC). By "DNC" is meant quantum-confined, separated, tiny, luminescent particles with nanometer dimensions, typically 100 Å or less in size, of certain luminescent materials activated with certain activators, which, when excited, will efficiently emit radiation characteristic of the activator. Since the luminescent particles are very small, a layer that is several of such particles thick can be made very thin, of the order of 1000 Å or less.

In accordance with a preferred aspect of the present invention, DNC phosphor layers for displays are prepared of doped nanocrystalline 2 to 5 nm particles of wide bandgap II–VI semiconductors and insulators using room temperature chemistry. For example, DNC powder of $ZnS:Mn^{2+}$ shows characteristic emission of $Mn^{2+}$ and its efficiency is comparable to that of bulk ZnS:Mn powder [5]. Besides high efficiency, these doped nanocrystalline particles yield extremely fast luminescent lifetime which is about six orders of magnitude faster than in the bulk phosphors [4]. This demonstrates that in DNC, impurity associated emission can be very efficient and fast due to electron-hole localization at the impurity [4].

In accordance with another aspect of the present invention, the ultra-fast speed of the DNC phosphors is put to use for digital control of gray scale and high contrast in various displays.

Besides $ZnS:Mn^{2+}$, other phosphors useful in displays according to the invention include II–VI host phosphors incorporating or doped with rare earth impurities such as Thullium (Tm), Terbium (Tb) and Europium (Eu) for blue, green and red phosphors, respectively. Other suitable host phosphors are nanocrystalline powders of Zinc Sulphide (ZnS) and Yttrium Oxide ($Y_2O_3$). Cerium (Ce) or Gadolinium (Gd) when incorporated as dopants in nanocrystals will yield UV emitting phosphors which can be used in displays alone or containing other phosphors emitting visible light when excited by UV.

The various features of novelty which characterize the invention are pointed out with particularity in the claims annexed to and forming a part of this disclosure, For a better understanding of the invention, its operating advantages and specific objects attained by its use, reference should be had to the accompanying drawings and descriptive matter in which there are illustrated and described the preferred embodiments of the invention.

DETAILED DESCRIPTION OF THE PREFERRED EMBODIMENTS

The current trend of HDTV displays is to be light weight, flat-slim, high contrast, bright, and capable of being high resolution at an acceptable cost. To enjoy the benefits of HDTV the display area should be larger than the conventional TV system, typically 36 inches across the diagonal. Initially, projection type displays are more suitable for large display areas. No display satisfies all the requirements today. Displays presently under development consist of next generation CRTs (including HDTV), field emission displays, electroluminescent displays, digital micromirror displays, plasma displays, laser based projection systems, low voltage cathodoluminescent displays, active-matrix and ferro-electric LCD displays, and many more. However, while the present invention will offer benefits in many of the abovementioned displays, the most significant improvements will be obtained with display types such as CRTs, and FEDs, plasma and EL, chiefly because the latter group involves the use of luminescent materials (active displays) for the transfer of information to an audience.

The limitations faced by PTV to be used as HDTV is now briefly discussed. The next generation HDTV will use CRTs with an aspect ratio of 16:9 and aproximately 1000 raster lines. The individual color tubes used in present PTV systems are 7" tubes and a raster of 5" is used. For high intensity operation, the blue phosphors are already saturated. For HDTV we must increase the size of the individual color tubes to 9" and a raster of about 7". But, a 9" tube system with associated optics becomes too bulky and expensive for the consumer. Taking into consideration that HDTV has a 16:9 aspect ratio (compared to 4:3 in normal PTV) and requires an increased light output for enhanced experience, this translates into a size reduction of the focussed spot from 250 microns to 150 microns. This decreased spot size increases the current density by approximately a factor of three. The conventional bulk phosphors, particularly blue, lose efficiency and light output at such increased curent densities. Also the phosphors degrade rapidly. Thus, what is needed is more linear, non-saturable, efficient phosphors. DNC phosphors in this application will provide ultra-fast and efficient phosphors which may not only be linear but superlinear. Since the DNC phosphos are ultra-fast, they do not show saturation of light output when addressed by an intense electron or optical beam.

The ultra-fast speed of the DNC phosphors allows to solve another major problem of gray scale in X-Y addressed displays like FEDs, plasma and EL, as will be described in more detail below.

Figure 1:
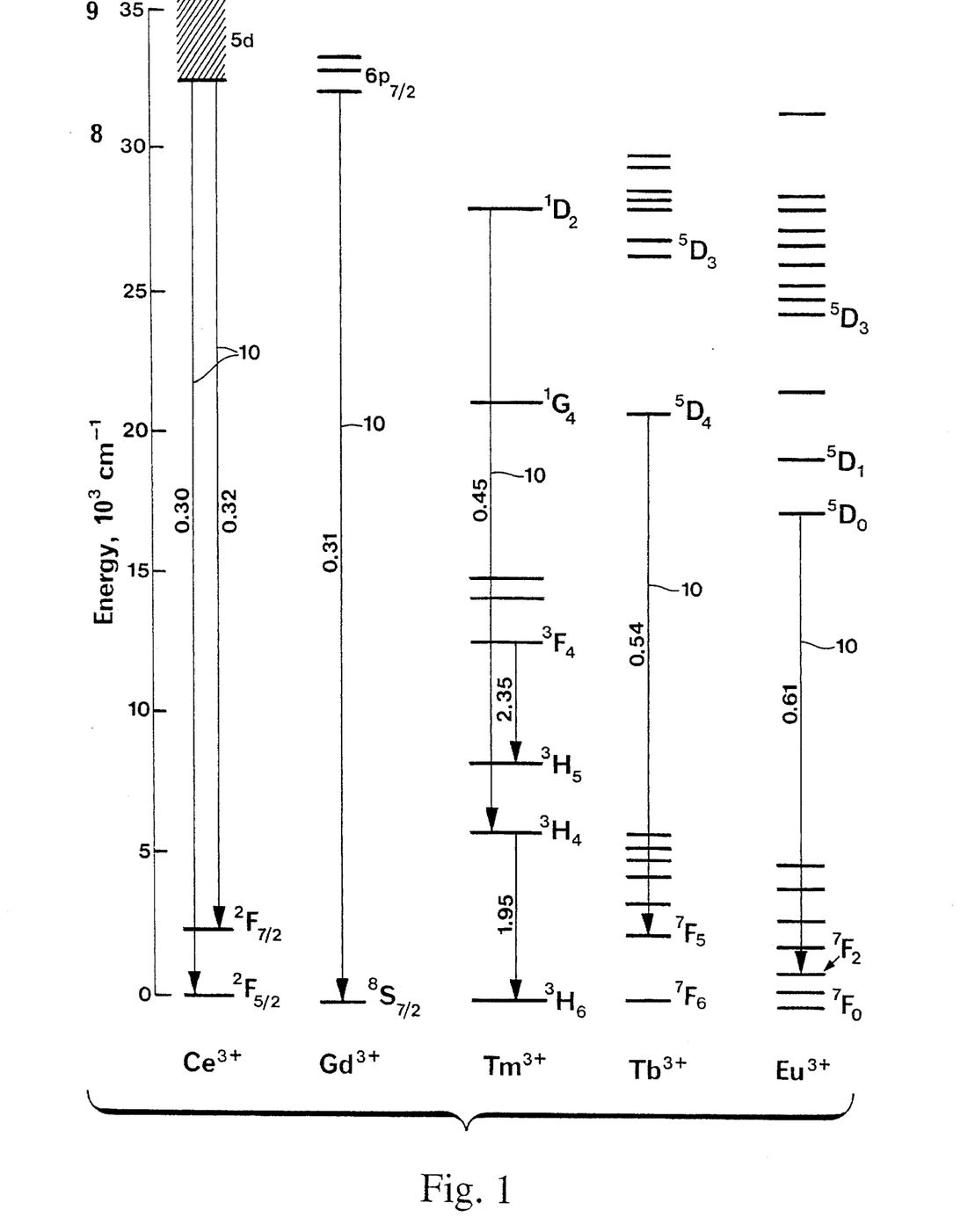
FIG. 1 illustrates band diagrams for five rare-earth dopants for use in DNCs in accordance with the invention, indicating radiative transitions from excited levels.

As the luminescent phosphor in these display applications, I prefer line emitting phosphors with rare-earth dopants due to their efficiency and narrow spectral distribution for better color purity. The majority of the dopants (also called activators from time to time) incorporated in DNC will be from rare-earth elements. FIG. 1 illustrates band diagrams for five of the rare-earth dopants. The atomic levels are as shown and labelled, and the arrows 10 indicate radiative transitions from excited levels. The energy jump indicates the wavelength of the resultant emitted photons. As shown in FIG. 1, the spectral range extends from UV (Ce, Gd), to blue (Tm), to green (Tb), and to red (Eu). The transition metal impurities (Mn, Cu) and deep impurities (Ag, Au, etc.) can also be incorporated to obtain broad band emitting DNC phosphors. To prepare efficient phosphors from DNC, preparation techniques are employed to ensure that, not only are small particles doped with an appropriate activator obtained, but they are also kept separated. As explained in the related application, whose contents are incorporated herein by reference, and in the references [4]–[6], whose contents are also incorporated herein by reference, the tiny nanometer particles must remain separated to exhibit the quantum-confined effects described herein. The chemical synthesis of DNC to achieve these results can rely on one of two possible mechanisms to limit the size of the crystallites: (A) the equilibrium size for the new phase (balancing free energy of a precipitated phase against the increased surface energy) is nanocrystalline-homogeneous growth, or (B) the new phase is grown at a low energy nucleation site within another material and the material size is limited by mass transport-heterogeneous growth. There are numerous reaction paths for both of these mechanisms which have been successfully applied, and these are included within the scope of this invention. Several of these techniques are listed below and are described in more detail in the related application or reference as indicated, whose contents are incorporated herein by reference:

1. Homogeneous precipitation at equilibrium in solution with reaction volume limited by micelles in solution in a volume limiting matrix (e.g. ion exchange resins, zeolites, porous glasses)([8] and references cited therein).

2. Reaction mediated molecular growth, such as molecular cluster synthesis (organometallic molecules forming inorganic cores) or polymer matrix reactions (e.g. ring-opening metathesis polymerization) ([4]–[6] and references cited therein).

3. Heterogeneous growth, such as nucleation and growth of nanocrystalline phase on matrix sites, or diffusional growth by aggregation of chemically stable molecules within a matrix ([8] and references cited therein).

It will be appreciated that the referenced publications, except for references [4]–[6], describe the preparation of undoped nanocrystals, but the same techniques with the modifications described in refernces [4]–[6] can be used to make the doped nanocrystals used in the invention.

As will be evident from the foregoing, DNCs is based on chemically preparing doped nanocrystalline particles of sizes preferably in the range of 2 to 5 nm of wide bandgap II–VI semiconductors and insulators using room temperature processing. As one example, which is not to be considered limiting, I have prepared manganese-doped zinc sulfide nanocrystals using mechanism A and technique 1 as follows. Diethylmanganese was synthesized first in a conventional manner and then mixed with diethylzinc in toluene solution. After addition of this solution to a hydrogen sulfide toluene solution, precipitation of the manganese-doped nanocrystals occurred. After centrifugation and subsequent rinsing of the particles, methacrylic acid and poly(methyl methacrylate) were used as surfactants to maintain the separation between the particles for quantum confinement. The surfactants allowed us to coat the surface of the particles and create a barrier for agglomeration and simultaneously provide surface passivation of the nanocrystalline particles. The other activators and hosts mentioned above can be made by similar techniques. This includes the preferred rare-earth dopants for visible light emitters. Thulium, terbium, and europium are the first three elements of choice. Their introduction can be similar to manganese doping in the zinc sulfide system. Other techniques such as the preparation of rare earth doped nanocrystals of ZnS using organometallic synthesis as well as non-aqueous sol-gel processing or a combination of both is also considered within the scope of the invention. To prepare these materials a synthesis of intermediate, metastable compounds may have to be undertaken.

DNC nanocrystalline powders of ZnS:Mn prepared as described above show characteristic Mn-yellow emission. The emission of Mn2+ and its efficiency is comparable to that of bulk ZnS:Mn powder [5]. Besides high efficiency, these DNC particles yield extremely fast luminescent lifetime which is about six orders of magnitude faster than in the bulk phosphors [4]. This demonstrates that in DNC, impurity associated emission can be very efficient and fast due to electron-hole localization at the impurity [1].

Figure 2:
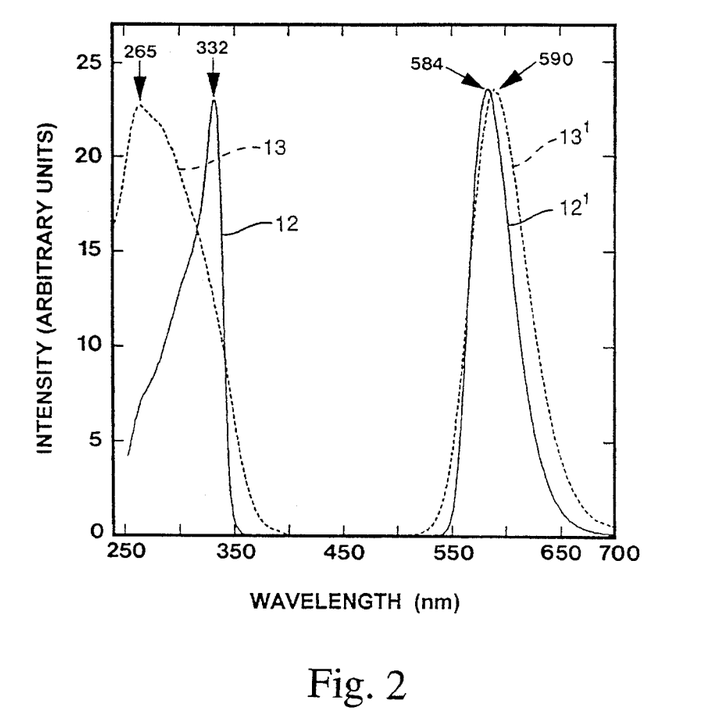
FIG. 2 shows the photoluminescent and photoluminescent excitation spectra and resultant emission spectra at room temperature of Mn-doped ZnS DNCs.
Figure 3:
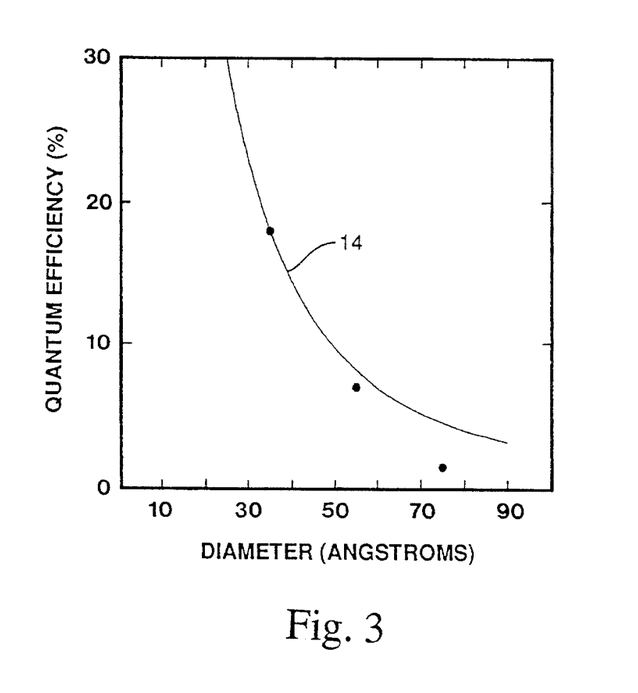
FIG. 3 shows the measured efficiency of the Mn-yellow emission and its strong dependence on the size of the Mn-doped ZnS nanocrystals.
Figure 4:
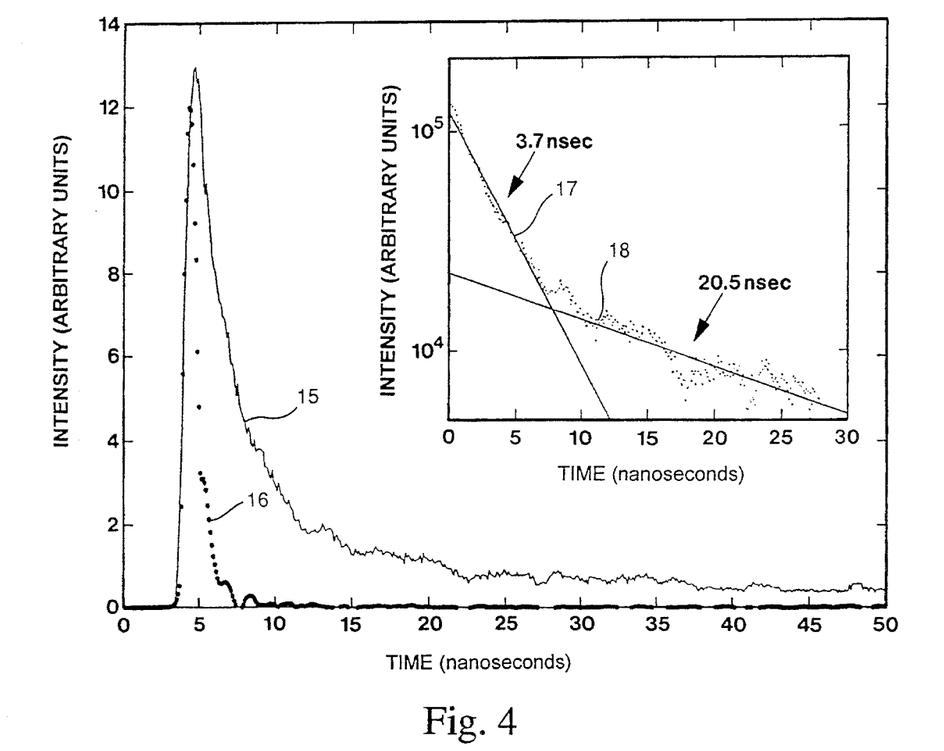
FIG. 4 shows in the main graph the transient yellow luminescence for 30 Å size particles, and its separation into its exponential decay components in the inset.
Figure 5:
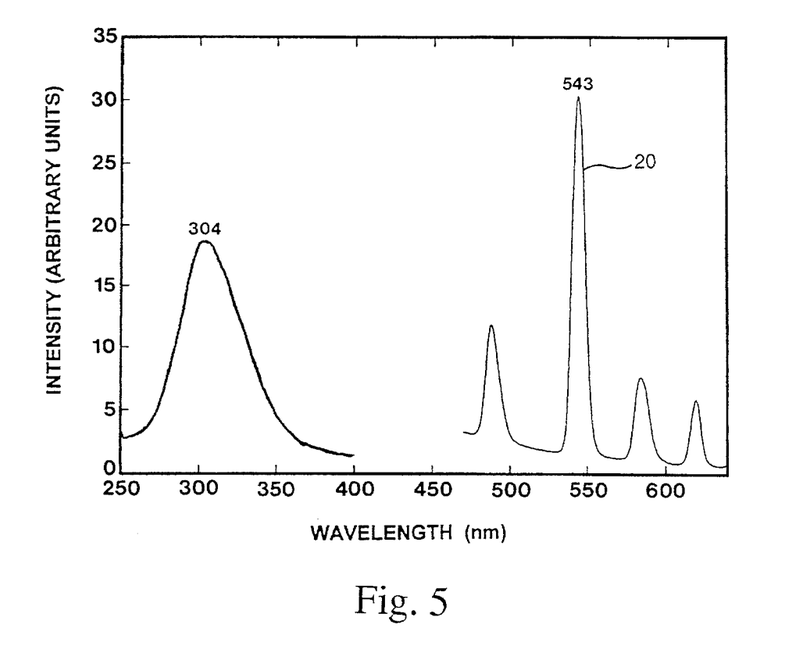
FIG. 5 shows the spectral output of $Tb^{3+}$ (green) in doped nanocrystals of ZnS in a polyethylene oxide matrix.

FIG. 2 shows some of the results obtained by us in DNC of Mn doped ZnS. FIG. 2 shows the photoluminescent (PL) 12 and photoluminescent excitation (PLE) 13 spectra and resultant emission spectra 12', 13' at room temperature. The spectra establish that the Mn-ion is an integral part of the ZnS nanocrystal. The measured efficiency of the Mn-yellow emission is over 20% at room temperature and strongly depends on the size of the nanocrystals, indicated by the curve 14 in FIG. 3. As the size of the nanocrystals decrease, the probability of electron and hole capture to the impurity increases and the e-h localization enhances the recombination rate via the impurity. Besides, the enhanced transfer rate from the host to the impurity, which has been measured, is less than 20 psec. This is accompanied by simultaneous reduction in the radiative lifetime of Mn-ion emission. In bulk crystalline material, the partially spin-forbidden Mn2+ 4T1-6A1 transition has a lifetime of about 1.8 msec. In DNC produced as described above, I find dramatic shortening of this decay time by about six orders of magnitude. FIG. 4 shows the transient yellow luminescence 15 for 30 Å size particles, measured by exciting 16 the host ZnS nanocrystals above the bandgap by a picosecond pulsed laser. The time decay is separated into its exponential decay components 17, 18 in the inset. We have also produced $Tb^{3+}$ (green) in doped nanocrystals of ZnS in a polyethylene oxide matrix as shown in FIG. 5 at 20. The shift of the bandgap (304 to 543) as measured from the PLE spectrum corresponds to particles of 60 Å size.

These results are important in that:

1) a room temperature processing was used for phosphor preparation, 2) high luminescent efficiency was achieved upon impurity incorporation in these quantum confined nanocrystals, 3) the nanocrystalline phosphors so obtained are six orders of magnitude faster than the corresponding bulk phosphors, 4) the recombination (trapping) time for the free particles is less than 20 picoseconds, 5) these phosphors are characterized by controlled morphology and high purity.

In applying the DNC phosphors to CRTs, I subdivide CRT systems into three groups. Direct View TV (DVTV), Projection TV (PTV), and High Definition TV (HDTV). It is expected that HDTV in the near future will come from PTV displays which involves three separate CRTs producing images in the primary colors. For present projection systems (not HDTV), sufficient brightness and resolution are obtained by excitation with an intense and very small electron spot. The diameter of the spot is about one tenth of the diameter in present DVTV and the maximum excitation density ($-2W/cm^2$) is about 100 times higher. These are difficult requirements for current PTV bulk phosphor screens. The requirements for luminescent efficiency of the phosphors under high excitation are much more severe when the higher resolution of HDTV requires a smaller pitch in the phosphor deposition and the excitation density is higher. The key properties of importance in PTV and HDTV phosphors are the energy conversion efficiency at high excitation densities, the chromaticity coordinate, phosphor decay time, thermal quenching, and the variation in luminescent efficiency under prolonged intense e-beam bombardment. The decay time of the phosphor should be short enough to avoid 'smearing' in moving images. Some of the efficient bulk phosphors used in direct view CRTs are not suitable for PTV and HDTV because the light output saturates strongly at high excitation densities. This is particularly true for the blue phosphors. It is therefore necessary to consider phosphors that are less efficient at low excitation densities but better at high excitation densities, because they are more linear. At high excitation intensities, attention must be paid to the degradation of phosphor efficiency under prolonged e-beam excitation. Most phosphors suffer so called 'Coulomb aging' which means that the decrease of the light output at a fixed acceleration voltage depends only on the deposited charge per unit area.

Figure 6:
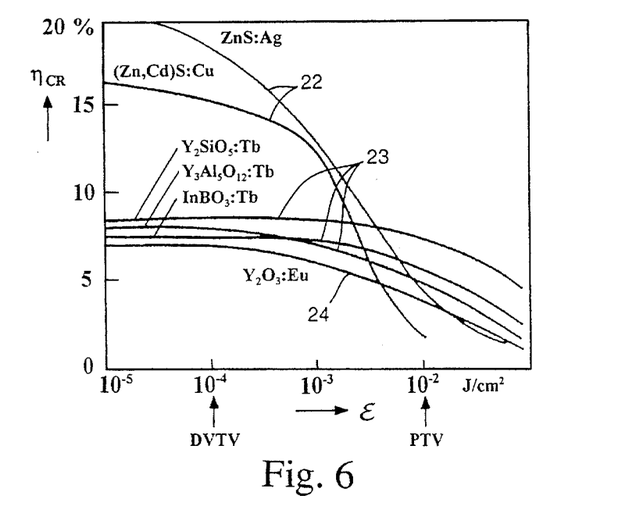
FIG. 6 shows the energy conversion efficiency of phosphors as a function of excitation density per pulse for a fixed electron spot diameter.

FIG. 6 shows the energy conversion efficiency of phosphors as a function of excitation density per pulse for a fixed electron spot diameter. The efficiency of ZnS systems 22 is high at low excitation but falls off considerably at high excitation. On the other hand, the $Tb^{3+}$ and $Eu^{3+}$ phosphors 23, 24 have lower efficiencies at lower excitation densities but at higher excitation densities they have the advantage of superior linearity.

In direct view CRTs for HDTV displays, the pitch on the phosphor screen needs to be finer. This leads to a considerable loss of electrons at the high resolution shadow mask and is largely responsible for the reduction of the light output.

To get around the problem of severe saturation in HDTV, it has been suggested that one use 9" projection color tubes instead of 7" tubes as used in present NTSC-PTV systems. However, this becomes an expensive nightmare due to the need for large optical components to spatially converge the color images. Alternatively, one can consider operating CRTs at lower voltage to make a more compact PTV system even more compact.

There are two major problems associated with e-beam excitation of phosphors at low voltages. First, there is a non-luminescent dead layer of about 30 Å due to surface recombination (non-radiative) and recombination at other defects at the interface of binder and phosphor. For 2 keV electrons, the penetration depth is about 330 Å and hence the dead layer may not contribute significantly to a non-radiative shunt path. However, for penetration depths less than the diffusion length, which is true for 2 Kev electrons, carriers are able to diffuse and recombine non-radiatively at the surface and inside the dead layer. This leads to very poor efficiency at low voltages as shown by the curves in FIG. 7 of phosphor efficiency as a function of excitation voltage for green ZnS type phosphors.

Figure 8:
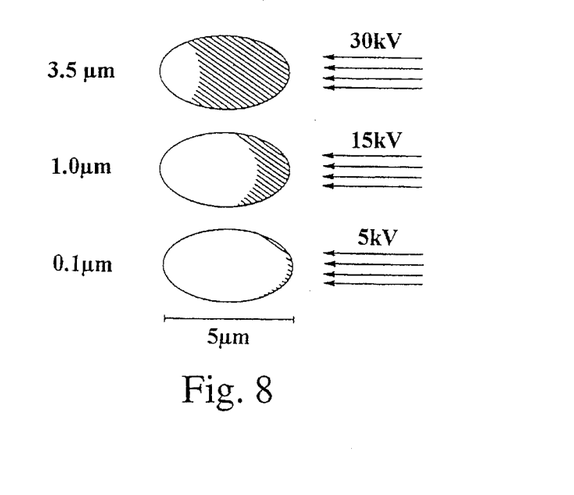
FIG. 8 depicts the variation of the penetration depth of electrons for three different voltages for 5 μm phosphor particles.

The second problem at low voltages has to do with the degradation of phosphors (Coulomb aging). FIG. 8 depicts the variation of the penetration depth for three different voltages for 5 μm phosphor particles. As the voltage decreases the penetration depth also decreases and the total charge deposited per unit area increases. In case of accelerating voltages less than 5 keV most of the charge is deposited near the surface. It is known that most phosphors show degradation at a net deposited charge of about 200 C/cm$^2$. Because the charge density near the surface is close to this value, phosphors degrade rapidly. The poor efficiency of phosphors at low voltages also is a problem in oscilloscopes, where brightness drops are due to the small penetration depth of the primary electrons. This prevents the use of an aluminum backing and thus the luminescence emerging at the gun side is lost.

Another application where brightness of the phosphor is a critical issue is in the display of high information density images, as in intelligence and medicine. Radiologists currently view x-ray films on light boxes with a peak brightness of 500 fL and an average brightness of 50 fL. Hence they would like CRTs with 2500×2500 pixels with luminance of about 400 fL.

Figure 9:
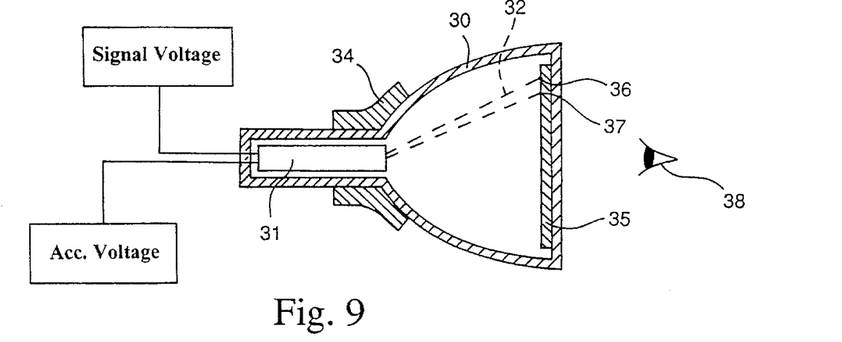
FIG. 9 schematically illustrates one form of CRT containing a DNC phosphor screen in accordance with the invention.
Figure 10:
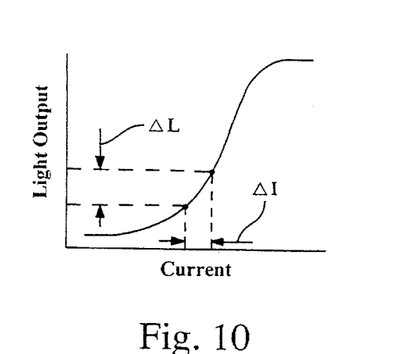
FIG. 10 is a graph illustrating that the light emitted by a phosphor is a function of the beam current impacting on the phosphor.

Many of these problems can be overcome in accordance with the invention by employing a DNC phosphor screen in the CRT, illustrated schematically in FIG. 9, which depicts the usual CRT envelope 30 containing at one end an electron gun 31 for producing an electron beam 32 which can be scanned by a deflection system 34 across a DNC phosphor screen 35. In such CRTs, grey scale is achieved by increasing the beam current by varying the signal voltages applied to the gun 31, whether the phosphor screen is black and white or in color. In the latter case, three guns, one for each of the colors green, red and blue, are used. FIG. 10 illustrates that the light emitted by the phosphor is a function of the beam current impacting on the phosphor. Ideally, one wants a contrast ratio between bright and dim of about 1000:1, which means one thousand observable variations ΔL between current changes represented by ΔI. Bulk phosphor screens typically exhibit at best a ratio of about 100:1. The DNC phosphor screen is capable of a contrast ratio of up to about 1000:1, explained in more detail below.

Another important advantage of a DNC phosphor screen in a CRT is the tiny size of the DNC particles. As explained in connection with FIG. 8, the electron penetration depth of the particles is a function of beam acceleration voltage. With tiny particles, low beam voltages under 10 kV can be used which immediately offers the advantage of avoiding breakdown between display components. In addition, almost complete penetration of the tiny particles is obtained, which means that more of the activators become involved in light emission. The big advantage of the tiny DNC particles is that the electrons and holes created by accelerated electrons will always recombine close to the activator without losses to the surface. Thus, tiny DNC particles can emit light even at low voltages in the range of 100–500 V and small penetration depth. Still further, tiny particles means that thin screens can be prepared, of the order of 1000 angstroms or less. This means better heat dissipation by the screen support, which means that higher beam currents are possible and thus more light generation, and less light absorption by inactive phosphor underlayers.

Another important advantage is the fast decay of the DNC phosphor particles. As illustrated in FIG. 9, when the beam lands on a screen pixel or spot at 36 and then moves to an adjacent pixel or spot 37, if the spot 36 is still emitting when the beam reaches spot 37, then an observer 38 will not be able to resolve the two spots, which translates into poorer resolution. With the DNC particles, the light decay is much faster with the result that an adjacent spot can more easily be resolved than with bulk phosphor screens. Hence, a higher resolution is inherent with the fine size of the DNC particles. Moreover, as indicated in FIG. 6, when the rare-earth doped phosphors are used, their efficiency as a function of current density is more linear. Hence, a selected color balance can be maintained more easily over a wider range of screen intensities. Moreover, superlinear phosphors can be obtained in DNC due to fast recombination (trapping) times at the activator and simultaneous ultra-fast generation of impurity emission. An advantage of superlinear phosphors is that higher intensities are possible without saturation.

Figure 11:
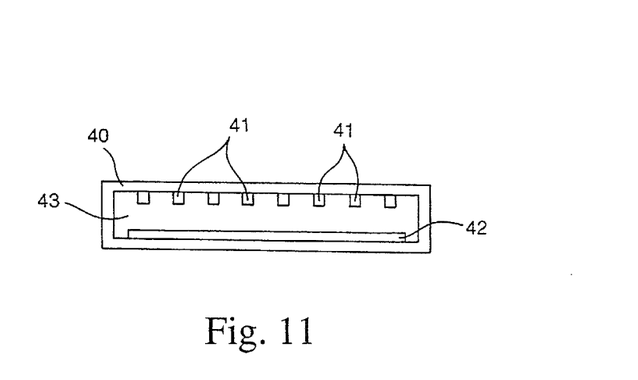
FIGS. 11 and 12 schematically illustrate in an end and top view, respectively, the basic geometry of a flat panel display of the X-Y matrix addressed type which can include a phosphor screen in accordance with the invention.
Figure 12:
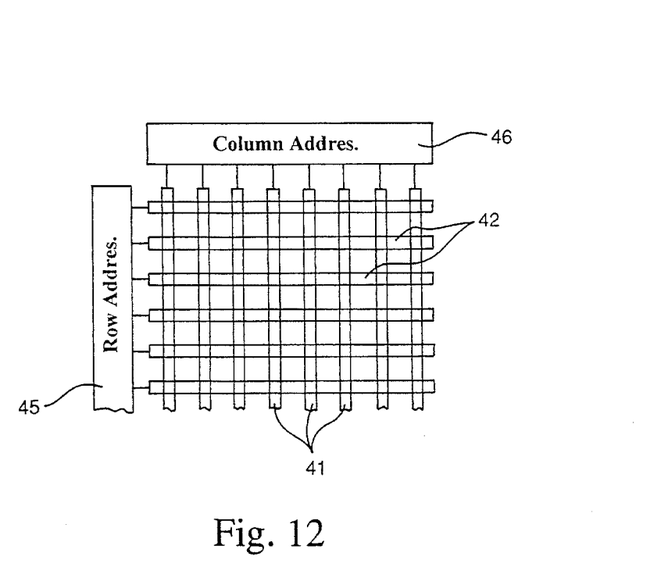
Figure 13:
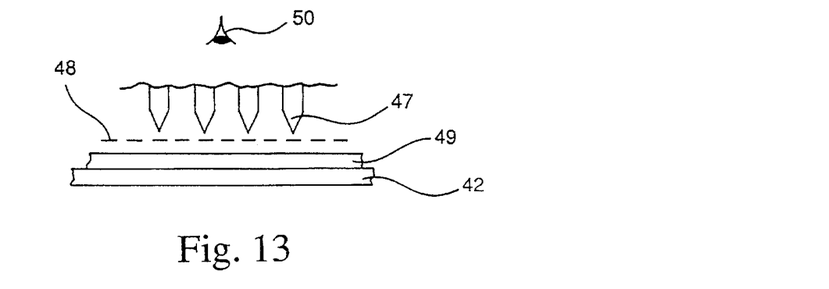
FIG. 13 schematically illustrates an FED active structure of the invention provided in the intermediate space of the device of FIG. 11.

Equally important improvements are possible with flat panel displays of the X-Y matrix addressed type. FIG. 11 schematically illustrates in an end view the basic geometry, comprising a sealed envelope 40, typically of glass, having on its interior crossed sets of electrodes 41, 42 on opposite sides of an intermediate space 43. The top view in FIG. 12 shows the crossed electrodes. Their intersections define the image pixels, selected by applying row addressing voltages 45 and column addressing voltages 46. The voltages are chosen such that only selected crossings can be activated, as explained in detail in references [1]–[3]. The different types of displays are characterized by the nature of the active structure provided in the intermediate space 43. In the FED type, the active structure comprises sharp metal microtips, shown at 47 in FIG. 13. Cold electrons are extracted from the microtips 47 by applying a reasonable voltage (in the range of 100 V) between a gate 48 and the microtip cathodes. These electrons are accelerated in vacuum towards the anode electrode 42, which is biased at a higher potential than the gate. These electrons upon impinging on a phosphor layer 49 on the anode produce cathodoluminescence (CL) and the image is observed 50 from the opposite side. The anode/cathode voltage is limited to a few hundred volts by breakdown hazard due to the short distance between the two electrodes (~2001 μm) which is required for proximity focusing. Therefore, a low voltage to excite the phosphor and an efficient CL phosphor under low voltage excitation will improve considerably such products.

The current bulk phosphors used in the color FEDs are ZnS based. The efficiency of these phosphors in lumens/watt are typically an order of magnitude lower than that of conventional CRT phosphors. The main reason for this is that at low voltages the surface recombination dominates. The surface recombination is entirely non-radiative and hence the luminous efficiency is very poor. This was earlier pointed out in connection with FIGS. 7 and 8.

Figure 7:
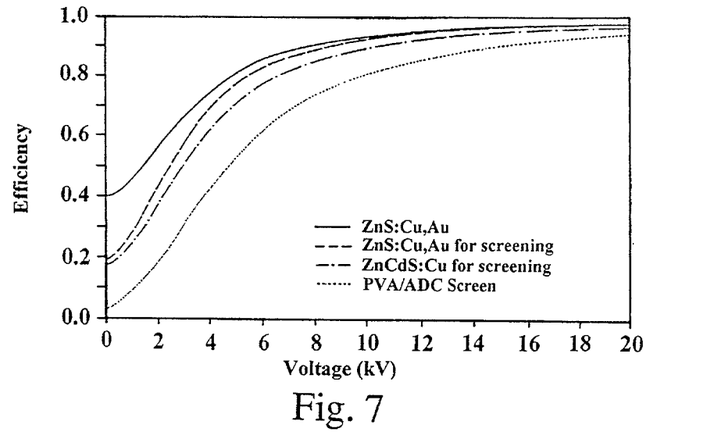
FIG. 7 shows phosphor efficiency as a function of excitation voltage for green ZnS type phosphors.

In addition to the above, a serious problem of degradation of the device exists. The electron density (Coulombs/cm$^2$) as shown in FIG. 7 is extremely high for low voltage excitation since the penetration depth is rather small. With bulk phosphors, when low voltages are used, the excitation volume is significantly small so as to make the charge densities (C/cm$^2$) large. This increase degrades the phosphors over operating time (Coulomb Aging). The other reliability issue is that during operation of the device, ZnS decomposes and the microtips (cathodes) are poisoned by the sulfur gas. These disavantages are overcome by using DNC phosphor layers in the FED, because the DNC phosphors are low voltage phosphors because of their tiny size, they can yield efficiencies in the range of 50 lumen/watt, they are robust so as not to degrade under high currents from decomposition into its chemical constituents, and they do not suffer the Coulomb Aging problem.

Figure 14:
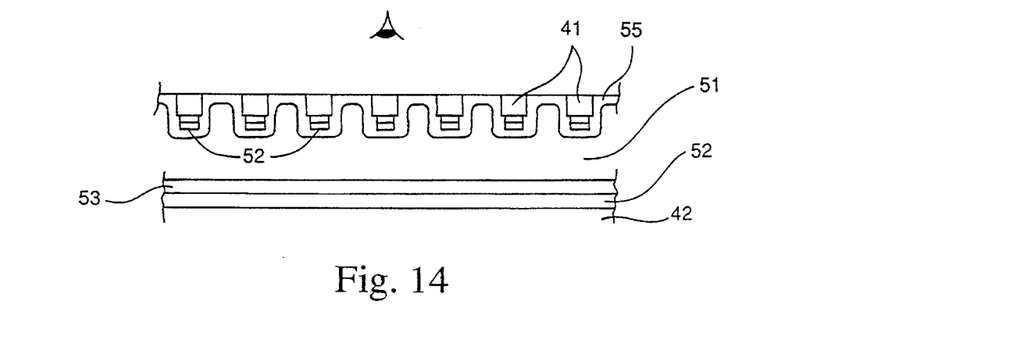
FIG. 14 schematically illustrates an AC-plasma type structure of the invention provided in the intermediate space of the device of FIG. 11.
Figure 16:
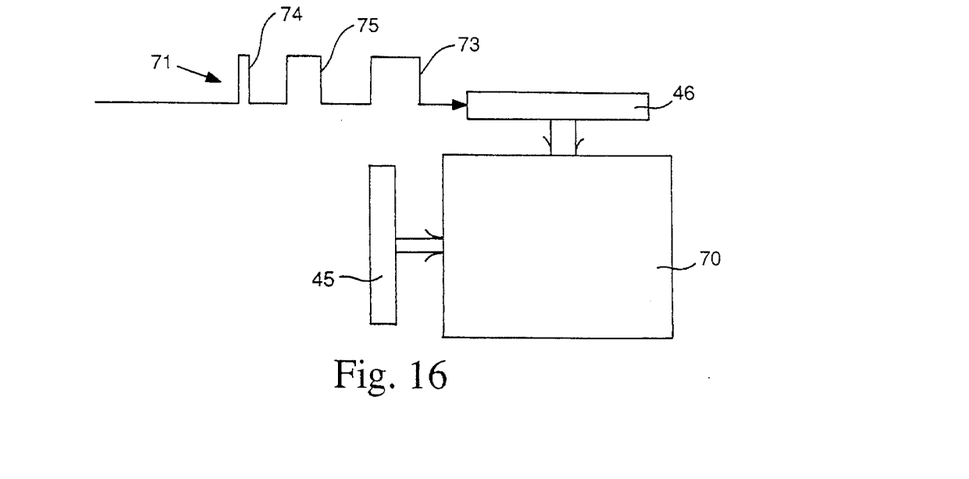
FIG. 16 schematically illustrates a display of the matrix-addressed type activated by a pulse width modulation scheme in accordance with another embodiment of the invention.

Another example of a flat panel display improved with DNC phosphor layers are DC- and AC-plasma displays. In this case, the intermediate space is filled with a gas mixture to facilitate local gas discharges which generate UV radiation to excite phosphors. DC-plasma displays have special problems so this embodiment of the invention is best represented by AC-plasma displays. AC-plasma displays (FIG. 14) have their electrodes 41, 42 insulated from the gas 51 by a thin film 52 of insulating material, usually MgO, which, in turn, is coated with a transparent film 53 of a low work function and therefore sputtering resistant material. The UV responsive phosphor layer 55 is on the front glass as well as on the select (write) electrodes 41 which are transparent to the visible radiation produced, which is typical of the electrodes in all of these flat panel displays on the viewing side. The gas mixture 51 of neon and a small amount of xenon reduces the firing voltage. The entire display, when operated, is supplied with a sustain voltage, which is just below the cell firing voltage. When a write pulse is applied to any pixel, the pixel fires continuously and charge stored in the dielectric layer 52 steps up the pulse voltage to reach the sustain voltage. An erase pulse reduces the stored charge and firing stops. The panel, therefore, stores charge because of a pixel which fires continuously until it is erased. This storage increases the UV generation and visible luminance significantly; however, the panel's gray scale is limited. These disadvantages are overcome by using as the phosphor a UV-responsive DNC particle layer, which has fewer gray scale limitations, a higher phosphor efficiency, and slower life-time degradation. As will be described below, the concept of digital addressing of FIG. 16 as applied to FED/EL displays also applies to plasma systems. All of the visible light-emitting DNC phosphor materials described are also capable of being excited by UV radiation.

Figure 15:
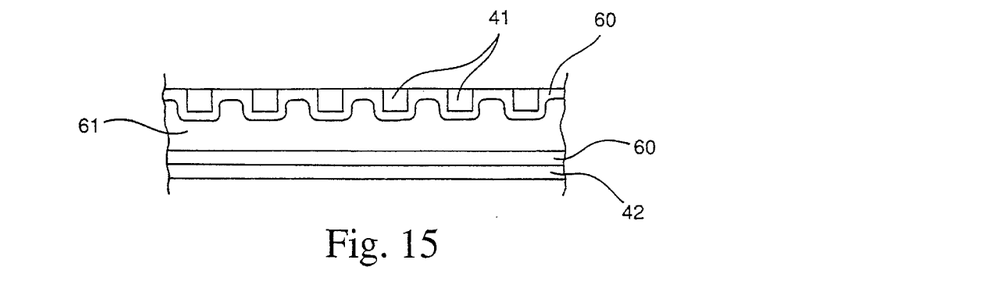
FIG. 15 schematically illustrates an EL active structure of the invention provided in the intermediate space of the device of FIG. 11.

Another embodiment of a display according to the invention is an EL display, which are thin film devices based on electrical breakdown of an active film and simultaneous energy transfer to a luminescent activator. A typical geometry is shown in FIG. 15, in which the intermediate space (43 in FIG. 11) is filled with a structure comprising dielectric layers 60 over each of the electrodes 41, 42 as schematically illustrated in FIG. 15. A phosphor layer 61 fills the space between the dielectric layers 60. Originally ZnS:Mn thin films were used in the EL display with external efficiencies in the range of a few percent when driven at 250 V AC. The best reported external efficiency was about 8 lm/w. To obtain other colors, CaS:Eu$^{2+}$ (red) and SrS:Ce$^{3+}$ (blue-green) and SrS:Ce,Eu (White) were fabricated. However their efficiencies were in the range of 1 lm/w. Today, EL displays offer unique properties such as flat-slim and high contrast but suffer from (1) poor efficiency, (2) limited color availability and control, (3) lack of gray scale, and (4) expensive drives for high voltage operation.

As will be clear from the foregoing exposition, an EL display whose phosphor layer comprises a DNC particle layer will exhibit higher efficiency, improved grey scale, and due again to its tiny sized particles will operate at low voltages.

From the above discription, we can summarize so far the advantages of displays using DNC phosphors. They include high brightness and efficiency, higher saturation of light output, less degradation of phosphor efficiency, low voltage operation, smaller grain size for better resolution, narrow line emitting phosphors and color coordinates.

A critically important advantage of the DNC phosphor is its high speed of response. Fast phosphors can yield high resolution, high contrast displays. This is possible when the speed of the phosphor is significantly faster than a single frame-time of the display. This can be explained as follows.

For progressive scan systems, a single frame time is about 16 msec. For three colors to be displayed, this reduces to about 5 msec. Additionally, the necessary shades of gray or color required by conventional 8-bit system supplies 256 quantized (digital) levels for each color. This makes it possible to display more than 16 million (256$^3$) colors from the three 8-bit primary colors. To achieve the 256 shades of color within the frame time the phosphors must be driven by a pulse-width modulation (digital) scheme within the time frame of 5/256 msec. This corresponds to 20 µsec. Hence in order to control the required gray scale the luminescent lifetime of the phosphors should be as fast as 20 µsec or less. The lifetimes of the current bulk phosphors are typically from 0.1 to 5 msec, much too slow for digital control of the grey scale. An example will illustrate the point and as the example I choose the digital micro-mirror devices (DMD) recently developed by Texas Instrument [3].

In this display, the pixel is a hinged micro-mirror which cannot make a gray scale by itself. To generate the gray scale, the DMD should be addressed by a fast pulse-width-modulated pulse train and the micro-mirrors must respond in that time frame. By setting up a clock fast enough, the pixel with 100% (position 256) duty cycle would be white. By changing the clock duty cycle to 50% (position 128) one can achieve a gray scale of 50%. In this position, the mirror would remain in the on-state for one half the time. The human eye, being part of the overall optical system, integrates the light during each frame so that the correct hues or shades of gray are seen. This digital control allows one to achieve high contrast pictures.

The application of digital control of the gray scale in X-Y matrix addressed displays using phosphors can only be realized if the phosphors are fast. In this scheme according to the invention, I utilize the speed of the phosphor similar to the old method of gray scale manipulation through shuttering of incoming signal. Since the DNC phosphors have a luminescent decay time in the range of 4 to 20 nsec, the availability of potential shades of gray and the contrast enhancement can be increased in such displays with DNC phosphors by another order of magnitude. For example, a contrast of 100:1 in current displays is considered very good. However, the combination of a pulse-width modulation scheme and the ultra-fast speed of the DNC phosphors, a contrast ratio of up to 1000:1 and beyond can be achievable. The display can be of the FED, plasma or EL type but with a DNC phosphor. The pulse width modulation scheme used can be of the type described in reference [3], illustrated in FIG. 16, wherein the display, designated 70, is of the type illustrated in FIGS. 11–15, and the pulse-width modulated waveform 71 is applied to the column addressing block 46. The waveform 71 shows a signal 73 to represent white, a signal 74 to represent a medium grey, and a signal 75 to represent a light grey. Such digital displays will find important uses especially in medical imaging. It will also be appreciated that the pulse width modulation illustrated in FIG. 16 can be viewed as a form of digital addressing since the different pulse widths can be implemented as a different succession of uniform narrow pulses whose number is represented by a digital number, with the eye acting as an integrator of the resultant succession of light pulses.

With certain DNCs, using cerium or gadolium, the emission is UV or black light. The display would then need a second phosphor layer which when excited by UV emits visible light if that is the object. Any of the visible-emitting DNCs described herein can also be excited by UV. A suitable display can then be fabricated in which a first layer of UV-emitting DNCs, e-beam or X-Y matrix adddressed, produces a UV image, which in turn can excite an adjacent second layer of visible-emitting DNCs. Alternatively, the UV image can be viewed with a conventional light intensifier responsive to UV.

DNC phosphor layers are readily prepared in conventional ways. For example, the nanocrystalline powders made as described above can be suspended in polyvinyl alcohol and ammonium dichromate solution and applied as a coating to a suitable support, using conventional coating techniques, such as spin-coating, or aerospray. A thin conducting overcoating can be applied to prevent charging under the electron beam. A layer thickness below 1000 Å is preferred. In the case of the CRT, the support could be a glass faceplate. For the other displays, the support would be the substrate shown.

It will be understood that all conventional means can be employed to construct color displays using the DNC phosphors of the invention, such as a shadow mask in a CRT. An additional benefit of the ability to make very thin layers from DNC phosphors is the increased spatial resolution of the addressed pixel. This will be appreciated in shadow mask CRTs, but will also prove of value in a known beam index construction from the ability to make finer pitch vertical phosphor lines of the three colors without loss of intensity.

While the invention has been described in connection with preferred embodiments, it will be understood that modifications thereof within the principles outlined above will be evident to those skilled in the art and thus the invention is not limited to the preferred embodiments but is intended to encompass such modifications.

LISTING OF REFERENCES

[1] S. W. Depp and W. E. Howard; Scientific American, March 1993, Pgs. 90–97.
[2] K. I.Werner; IEEE Spectrum, Nov. 1993, Pgs. 18–26.
[3] J. M. Younse; IEEE Spectrum, Nov. 1993, Pgs. 27–31.
[4] R. N. Bhargava, D. Gallagher, X.Hong, and A. Nurmikko; Phys.Rev. Lett. 72,416 (1994).
[5] R. N. Bhargava, D. Gallagher, and T.Welker; J.of Luminescence 60861, 275–280, 1994.
[6] D. Gallagher, R. N.Bhargava, J.Racz, and W.Heady; J.of Crystal Growth 138, 970 (1994).
[7] Y. Wang, N. Herron, J. Physical Chem., V. 95, p.525, 1991.
[8] P. A. Biancon et al., Nature 349, 315, 24 Jan. 1991.

What is claimed is:

1. A display device comprising:
   (a) a phosphor material capable upon excitation of emitting radiation in the UV and visible spectral range,
   (b) means for exciting the phosphor material,
   (c) said phosphor material comprising separated particles of a host compound activated by a dopant providing when excited radiative transitions emitting in said UV and visible spectral range, said particles being of the order of 100 angstroms or less in size and exhibiting quantum-confined properties.

2. The display device of claim 1, wherein the host compound is a II–VI compound.

3. The display device of claim 2, wherein the dopant is a rare earth element.

4. The display device of claim 3, wherein the rare-earth element is selected from the group consisting of Tm, Tb, and Eu.

5. The display device of claim 1, wherein the host compound is a line-emitting phosphor with a rare earth dopant.

6. The display device of claim 1, wherein the particle size is between about 2–5 nm.

7. The display device of claim 1, wherein the phosphor material is in the form of a layer of 1000 Å or less.

8. The display device of claim 2, wherein the device is a CRT, and the means for exciting is an electron beam.

9. The display device of claim 8, wherein the means for exciting comprises means for accelerating the electron beam with a low voltage under 10 kilovolts.

10. The display device of claim 9, wherein the means for exciting comprises means for accelerating the electron beam with a low voltage in the range of 10–500 volts.

11. The display device of claim 2, wherein the device is an X-Y matrix-addressed device, and the means for exciting is electrons.

12. The display device of claim 11, wherein the device comprises an active structure comprising sharp microtips for generating cold electrons.

13. The display device of claim 11, further comprising pulse-width-modulation means for driving the device.

14. The display device of claim 11, further comprising means for digital addressing of the device.

15. The display device of claim 2, wherein the device is a beam index tube, the means for exciting is an electron beam, and the phosphor is in the form of fine lines.

16. The display device of claim 2, wherein the device is an X-Y matrix-addressed device, and the means for exciting is UV radiation.

17. The display device of claim 2, wherein the device is an X-Y matrix-addressed device, and the means for exciting comprises means for causing electrical breakdown in the device.

18. The display device of claim 17, wherein the device is a thin film device comprising dielectric layers.

19. The display device of claim 16, wherein the device comprises a space filled with a gas mixture to facilitate local gas discharges which generate the UV radiation.

* * * * *